Dec. 26, 1939.   H. E. FIGGIE ET AL   2,184,381
SPRING LEAF MANUFACTURE
Filed April 22, 1938
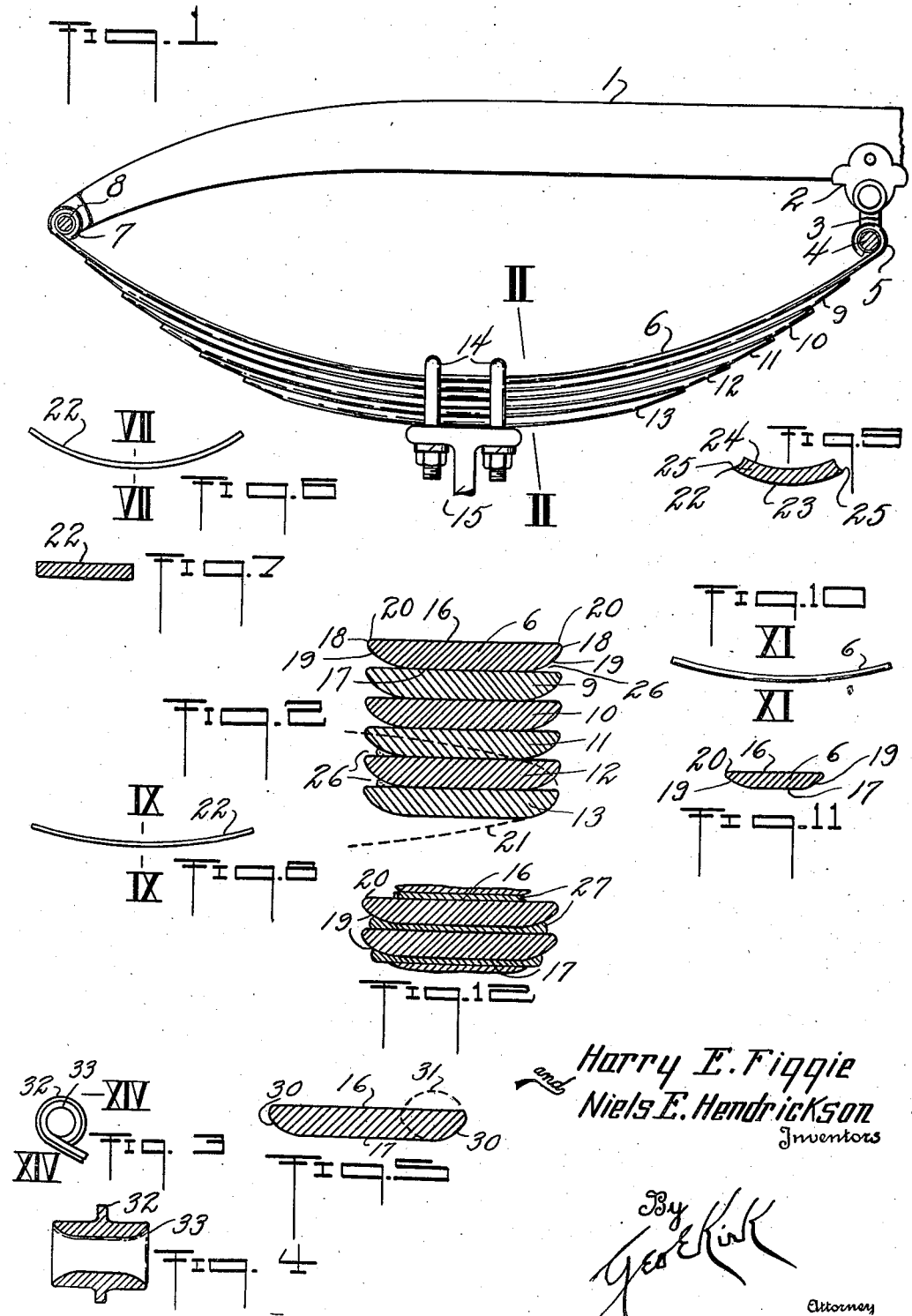
Harry E. Figgie
Niels E. Hendrickson
Inventors
By Geo E Kirk
Attorney Patented Dec. 26, 1939

2,184,381

UNITED STATES PATENT OFFICE 2,184,381

SPRING LEAF MANUFACTURE

Harry E. Figgie, Cleveland, and Niels E. Hendrickson, Toledo, Ohio, assignors to The Mather Spring Company, Toledo, Ohio, a corporation of Ohio Application April 22, 1938, Serial No. 203,506

3 Claims. (Cl. 267—47)

This invention relates to spring leaves, especially leaves for springs of the elliptic type.

This invention has utility when incorporated in vehicles for load-carrying, wherein prolonged life and reduced weight with superior economical stock is attained by marginal formation of the spring leaf cross-section at a region of tendency toward greater distortion.

Referring to the drawing:

Fig. 1 is a side elevation, with parts broken away, of an embodiment of the invention as located between the axle and chassis of an automobile;

Fig. 2 is a section on the line II—II, Fig. 1, showing the leaf configuration;

Fig. 3 is an enlarged view of the eye for the leaf spring hereunder, wherein the stock of the leaf has an outer rib;

Fig. 4 is a section on the line IV—IV, Fig. 3, showing this ribbed eye;

Fig. 5 is a form of the spring leaf formation having the mathematical function adapted for slight variance from that of Fig. 2;

Fig. 6 is a side elevation of a spring leaf in its normal bowed or arched condition and of normal rectangular cross-section as a flat leaf element;

Fig. 7 is a section on the line VII—VII, Fig. 6, showing this leaf spring;

Fig. 8 is a view of this spring leaf of Fig. 6 as flexed under load to cause the upper concave side to undergo tension, while the lower convex side is under compression;

Fig. 9 is a section on the line IX—IX, Fig. 8, showing a somewhat exaggerated form or departure from cross-sectional contour of which the concave side as under tension in the straightening out tendency crowds the lower corners to widen out as the crowded or compression lower side is convexed and the tension longitudinally less convexed upper side is transversely concave;

Fig. 10 is a view of a single leaf, say of the spring of Fig. 1, in flexed position away from the concave of Fig. 1 toward a straight line position;

Fig. 11 is a section on the line XI—XI, Fig. 10, showing in exaggerated form that, due to this marginal deformation the compression in this convex lower side is generally dissipated throughout the cross-section of the mass against deformation of either of the flat sides; and Fig. 12 is a sectional view through a leaf spring of the type herein with liner introduced to be locked between the spring leaves and as thus anchored have its effective region in the marginal portions.

Motor vehicle chassis 1 is provided with bracket 2 mounting shackle 3 having pin 4 for engaging eye 5 of leaf spring 6. The remote end of this spring leaf 6 is provided with eye 7 about pin 8 of the chassis 1. Herein there is grouped additional leaves 9, 10, 11, 12, 13, to be assembled by U-bolts 14 with axle 15. The spring leaf hereunder is shown as pre-formed for this generally arched or bowed shape, with major flat side 16, and opposed thereto, dissimilar side 17 in parallelism. The sides 17 toward edges 18 of the spring leaf have curved contours 19 which as to tension corners 20 of the sides 16 has a recession. This recession advantageously under the practice hereunder may be of parabolic form 21.

The utility herein is illustrated by comparison with normal rectangular spring 22 (Figs. 6, 7) as pre-formed in such condition of approximate parallelogram. Under load (Fig. 8), with this bow to be flattened out, the pre-formed concave side is thus thrown under tension and the lower side under compression. This is emphasized by this lower side 23 (Fig. 9) becoming convex and upper side 24 transversely concave, throwing compression corners 25 outwardly in distorting the general cross-section.

Under normal usage, as well as under test, these corners 25 develop the region of failure or tendencies toward weakening of spring leaves under the experience herein. To relieve this difficulty, this invention has taken this spring leaf 6 (Fig. 1) and as such is under load (Fig. 10) leaf side 16 under tension (Fig. 11) does not assume the transverse concavity 24 of Fig. 9 but approximates parallelism to the opposing side 17. This is attained for the reason that in lieu of the corners 25 there is curve contour or recession corner 19, which is not punished to develop cracks as these corners 25. Furthermore, there is avoided the crowding of the corners or termini for the concave edge 24. This means that the corners 20, in retaining their approximate symmetrical set-up or relation with the side 16, function for such tension action with a uniformity within the elastic limit for the spring, with avoidance of so close approach to the elastic limit as would otherwise arise. Thus, for a retained spring stiffness with resiliency, a weight saving of as much as 5 per cent or more is possible with a greater life for the spring due to its tendency to postpone fatigue. Furthermore, this symmetrical cross-section stock is one for which the rolling is economically and easily effected, even over special or non-rectangular type cross-section spring leaf. This means that the rolling mill dies are no more expensive, with less expense of upkeep. With the extreme flexing for eye terminus in the spring leaf, the eye symmetrical form is more readily established against concaving on the outside. In this set-up between the curvature or recession portion 19 as to the dissimilar longer side portion 16 as relatively abutting side 17 there is provided clearance portion 26, in which lubricant may be located and retained as a factor for lengthening the spring life in operation. Additionally, between the spring leaves may be introduced liners 27 (Fig. 12) to be tightly gripped or locked between the parallel opposing sides 16, 17, of the adjacent spring leaves for marginal portions of the liners to be less tightly compressed and thus function in the recess region 26.

Departure may be adopted from the recession of approximating the parabolic form for the recession 19, to convex portion 30 (Fig. 5), say as an element of ellipse 31.

In this production of the eye, instances arise wherein strengthening of the eye by reinforcing rib 32 (Fig. 4) may be in order and this is effective with a nicety herein independently of tendency for the eye 33 to be other than cylindrical form elsewhere in its contour.

In contributing to this feature for promoting spring life and retaining strength, there may be advantage hereunder in the modified flat spring configured toward semi-elliptical form. This means that there is conserving of spring life and strength in use of the spring substantial to resist side sway in vehicle practice and stand up under extremes of flexing against disaster arising under other practices.

The springs as herein disclosed for the advantage in performance and manufacture as to rolling have advantages which further extend into the heat treating stage of manufacture, for the reason that this metal body is not of such degree of departure in thickness at critical regions but is nicely responsive to the handling for efficient and effective heat-treatment due to the symmetry of cross-section as to avoidance of abrupt change in thickness region.

What is claimed and it is desired to secure by Letters Patent is:

1. A leaf spring element of approximately parallel opposing major extent sides of different widths for its flat portion in normal unflexed position, adapted to be flexed therefrom by tension on the wider flat side, the narrower side having approximately parabolic major convexly curved contour therefrom toward the wider side terminus, wherein said extent of such curved contour along the side is greater than the distance between the flat sides, there being minor convex curved contour approaching tangency for the junction of the sides with the major curved contour.

2. A leaf spring element of approximately parallel opposing major extent sides of different widths for its flat portion in normal unflexed position, the narrow width side being opposite the tension side, thereby forming convex curved surfaces oppositely disposed of similar parabolic form, with each of the curved surface widths greater than the thickness of the element, said curved surfaces approaching tangency as merging into the narrow side therebetween.

3. A spring leaf in which the compression side of the leaf has the corners cut away for a distance at least equal to the thickness of the leaf, the edges of the leaf having an approximately parabolic form, and the focus of the parabola being adjacent the tension side of the leaf.

HARRY E. FIGGIE.
NIELS E. HENDRICKSON.